United States Patent
Liang (10) Patent No.: US 12,085,382 B2
(45) Date of Patent: Sep. 10, 2024

(54) ROTARY POSITION ENCODING USING NON-MAXIMAL-LENGTH PSEUDO-RANDOM CODES

(71) Applicant: Novanta Corporation, Bedford, MA (US)

(72) Inventor: Chia-Pin Liang, Wayland, MA (US)

(73) Assignee: Novanta Corporation, Bedford, MA (US)

( * ) Notice: Subject to any disclaimer, the term of this patent is extended or adjusted under 35 U.S.C. 154(b) by 136 days.

(21) Appl. No.: 17/674,169

(22) Filed: Feb. 17, 2022

(65) Prior Publication Data

US 2022/0260365 A1    Aug. 18, 2022

Related U.S. Application Data

(60) Provisional application No. 63/150,173, filed on Feb. 17, 2021.

(51) Int. Cl.
*G01B 11/26* (2006.01)
*G01D 5/26* (2006.01)

(52) U.S. Cl.
CPC .............. *G01B 11/26* (2013.01); *G01D 5/26* (2013.01)

(58) Field of Classification Search
CPC ........ G01B 11/26; G01D 5/26; G01D 5/2495; G01D 5/34792
See application file for complete search history.

(56) References Cited

U.S. PATENT DOCUMENTS

| | | | | |
|---|---|---|---|---|
| 5,991,898 A * | 11/1999 | Rajski | ................. | G06F 11/2221 |
| | | | | 714/E11.163 |
| 6,597,526 B1 * | 7/2003 | Gray | ........................ | G11B 5/09 |
| 9,933,284 B2 * | 4/2018 | Goldman | ........... | G01D 5/34715 |
| 10,891,869 B1 * | 1/2021 | McIntosh | ............... | G08G 5/045 |
| 10,963,724 B2 * | 3/2021 | Bates | ........................ | G11B 7/09 |
| 2008/0233966 A1 * | 9/2008 | Scheim | ................. | H04L 5/0094 |
| | | | | 455/509 |
| 2009/0108188 A1 * | 4/2009 | Urabe | ................. | G01D 5/34776 |
| | | | | 250/231.1 |
| 2010/0033170 A1 | 2/2010 | Velasquez et al. | | |
| 2012/0286912 A1 | 11/2012 | Fullerton et al. | | |
| 2014/0003805 A1 * | 1/2014 | Singh | .................... | H04W 24/06 |
| | | | | 398/16 |

(Continued)

FOREIGN PATENT DOCUMENTS

WO    WO-2022178084 A1 *  8/2022  ............. G01B 11/26

OTHER PUBLICATIONS

"Absolute-Type Shaft Encoding Using LFSR Sequences With a Prescribed Length", Fuertes et al. IEEE Transactions on Instrumentation and Measurement (2008).*

*Primary Examiner* — Mohamed K Amara
(74) *Attorney, Agent, or Firm* — BainwoodHuang (57) ABSTRACT

A rotary position encoder includes a detection unit and a scale co-configured and co-operative to detect a relative rotational position and to generate a position output accordingly. The scale has a scale pattern according to a linear-feedback shift register (LFSR) pseudo-random code, which is a non-maximal length code having a seed value, tap positions, and modified least-significant bit position(s) of code words that satisfy rotary constraint by which each code word follows in sequence from the adjacent code word.

15 Claims, 7 Drawing Sheets

(56) References Cited

U.S. PATENT DOCUMENTS

| | | | |
|---|---|---|---|
| 2014/0079215 A1* | 3/2014 | Wei | H04L 9/0662 |
| | | | 380/46 |
| 2014/0112264 A1* | 4/2014 | Bao | H04W 72/20 |
| | | | 370/329 |
| 2014/0129824 A1* | 5/2014 | Paris | H04L 9/0637 |
| | | | 713/150 |
| 2015/0048242 A1 | 2/2015 | Remillard et al. | |
| 2015/0052586 A1* | 2/2015 | Mills | H04L 63/0428 |
| | | | 726/4 |
| 2016/0014806 A1* | 1/2016 | Jain | G06F 7/584 |
| | | | 370/329 |
| 2016/0320212 A1* | 11/2016 | van de Kerkhof | G01D 5/347 |
| 2017/0317761 A1* | 11/2017 | Chen | H04B 10/60 |
| 2018/0081376 A1 | 3/2018 | Zhang et al. | |
| 2020/0033373 A1 | 1/2020 | Van Grinsven | |

\* cited by examiner

Table 1 - LFSR Code Sequence

| Q R S T | IN = S .xor. T | Clock Cycle |
|---|---|---|
| 1 1 1 1 | 0 | 1 |
| 0 1 1 1 | 0 | 2 |
| 0 0 1 1 | 0 | 3 |
| 0 0 0 1 | 1 | 4 |
| 1 0 0 0 | 0 | 5 |
| 0 1 0 0 | 0 | 6 |
| 0 0 1 0 | 1 | 7 |
| 1 0 0 1 | 1 | 8 |
| 1 1 0 0 | 0 | 9 |
| 0 1 1 0 | 1 | 10 |
| 1 0 1 1 | 0 | 11 |
| 0 1 0 1 | 1 | 12 |
| 1 0 1 0 | 1 | 13 |
| 1 1 0 1 | 1 | 14 |
| 1 1 1 0 | 1 | 15 |
| 1 1 1 1 | 0 | 16 (repeats) |

Fig. 4

Table 1 - Non-ML Random Sequence

| Q R S T | IN = R .xor. Q | Clock Cycle |
|---|---|---|
| 1 1 1 1 | 0 | 1 |
| 0 1 1 1 | 1 | 2 |
| 1 0 1 1 | 1 | 3 |
| 1 1 0 1 | 0 | 4 |
| 0 1 1 0 | 1 | 5 |
| 1 0 1 1 | 1 | 6 (Repeat) |

Fig. 6

Table 3 - Modified Non-ML Random Sequence

| Q R S T | IN = R .xor. Q | Clock Cycle |
|---|---|---|
| 1 1 1 1 | 0 | 1 |
| 0 1 1 1 | 1 | 2 |
| 1 0 1 1 | 1 | 3 |
| 1 1 0 1 | 0 | 4 |
| 1 1 1 0 | 0 | 5 |

ROTARY POSITION ENCODING USING NON-MAXIMAL-LENGTH PSEUDO-RANDOM CODES

BACKGROUND

The present invention is related to the field of rotary position encoders.

It has been known to use codes sequences generated by Linear Feedback Shift Register (LFSR) for absolute position encoding. However, due to the inherent limitation of LFSR, the number of the encoded positions using maximal length random sequence (MLRS) is $2^m-1$, where m is the number of bits of the detection unit.

With similar minimum resolvable feature (linewidth), the size of rotary scale is quantized (power of 2) due to MLRS length limitation $2^m-1$. To create a scale with a size between the quantized dimensions, the size of minimum resolvable feature needs to vary linearly with the circumferential length of the scale pattern. Therefore, detection units with different resolving powers are needed for reading different scales.

SUMMARY

A rotary position encoder is disclosed that includes a detection unit and a scale, which are co-configured and co-operative to detect a relative rotational position and to generate a position output accordingly. The scale has a scale pattern according to a linear-feedback shift register (LFSR) pseudo-random code, which is a non-maximal length code having a seed value, tap positions, and modified least-significant bit position(s) of an end code word that satisfy a relaxed rotary constraint by which the seed value follows in sequence from the end code word. The use of a non-maximal-length code enables design and deployment of intermediate-size scales without requiring change of feature size and corresponding redesign of the detection unit. Said differently, a given detection unit can be used in combination with a variety of scales with size ratios not limited to powers of 2, providing for flexible and less costly deployment of position encoders with various size scales according to system needs.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Disclosed is a method to create a rotary pseudo random sequence with flexible number of encoded positions. The method enables reading rotary scales with a wide range of diameters using the same detection unit. The method includes searching the appropriate seed and tap numbers for linear feedback shift register, code insertion for the rotary constraint and check if the inserted codes have duplication in the sequence. Alternative embodiments include the methods of using the repetitive pseudo random sequences for extending the length of absolute encoding or improving the encoding resolution.

An important aspect of the disclosed method is generating rotary pseudo random sequence with arbitrary length for rotary absolute position encoding. Arbitrary length random sequence allows the user to create the rotary scales of different diameters with a fixed minimum feature and thus enable reading a wide range of absolute rotary scales with different sizes (diameters) using the same reading units (reading optics).

The method described in this invention can generate a rotary LFSR random sequence with arbitrary length for the scales with different diameter while maintaining the dimension of the minimum resolvable feature. Therefore, the same detection unit can be used for reading scales with much wider range of diameters.

Embodiments

Figure 1:
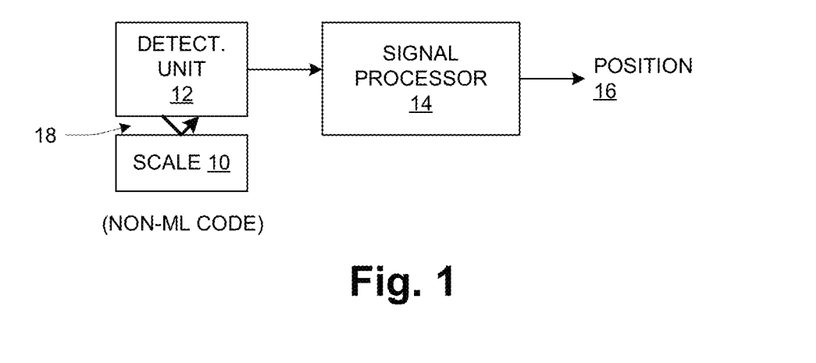
FIG. 1 is a block diagram of a rotary position encoder.

FIG. 1 shows a rotary position encoder as including a scale 10, detection unit 12, and signal processor 14. The scale 10 is indicated as having a non-maximal-length (NON-ML) code, as described in more detail below.

The general structure for a rotary position encoder as shown in FIG. 1 is generally known in the art, other than the use of non-ML codes. Thus, details for the detection unit 12 and signal processor 14 are not elaborated herein, and these may of course be realized in a variety of ways. Various details for the scale 10 are provided herein. Generally, it is assumed that it has a code track using a so-called pseudo-random sequence (PRS) code providing position indication. The PRS code may be used in a way that it provides "absolute" position throughout an entire range of relative movement (e.g., across 360 degrees), or it may provide quasi-absolute position over some smaller range, and be used with other features to provide supplemental position information as required. Examples are given below.

It is assumed herein that the encoder is an optical encoder, i.e., that the detection unit 12 includes optical transmitters and receivers and associated transducer circuitry, and the scale 10 is optically sensitive (e.g., uses a code track of varying opacity or reflectivity enabling the detection unit 12 to detect position by sensing variation of return beam(s)). The techniques described herein are also applicable to other position sensing modalities, including, but not limited to, inductive, magnetic, capacitive, and mechanical detection, etc. The invention is applicable to any sensing modalities that require design change for resolving the minimum resolvable feature with different size.

Although not shown in FIG. 1, in typical use the scale 10 and detection unit 12 are located on respective parts of a machine where relative rotational motion occurs, and the encoder senses position of the scale 10 relative to the detection unit 12 and generates a position output 16 indicative thereof. For a rotary encoder, the position output 16 may have units of angle (e.g., degrees or radians) or of fraction of a circle (e.g., 0.500 represents 180 degrees). In operation, the detection unit 12 generates one or more optical beams directed to the scale 10, receives reflected/transmitted beams therefrom, and converts the sensed optical energy into electronic signals indicative of sensed position. The optical beams are indicated generally at 18. The signal processor 14 operates on these low-level electronic signals to generate the higher-level position output 16 that may be used by other functional components in a system, such as a servo controller for a rotating component for example. In another embodiment, the detection unit 12 collects the physical signal, including but are not limited to, electrical, magnetic, electromagnetic, and mechanical signal from the scale 10 and process the signal with signal processor 14 to monitor the position 16 of the scale 10.

Figure 2:
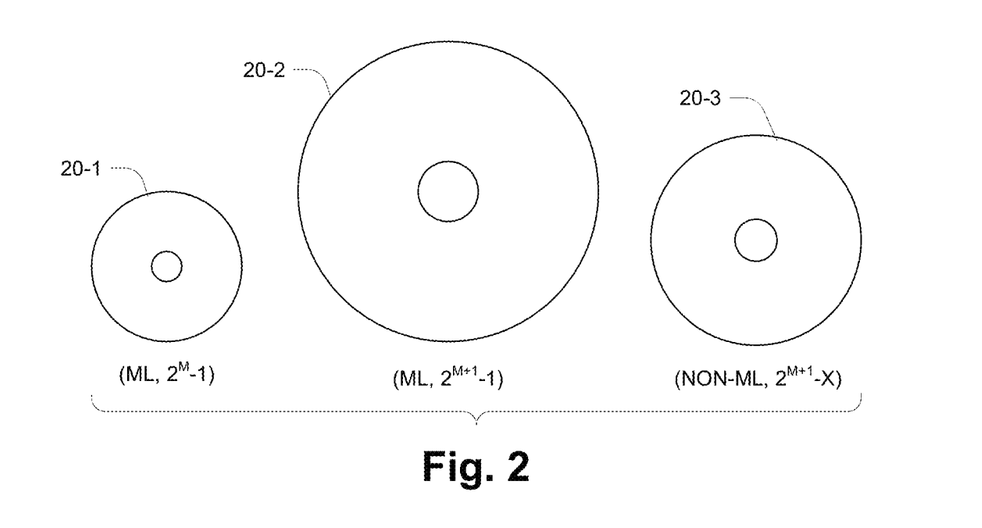
FIG. 2 is a schematic depiction of a set of encoder scales of different sizes.

FIG. 2 illustrates an aspect of the use of maximal-length (ML) sequences for position encoding. Three scales 20 are shown, and it is assumed that each realizes a code track using the same basic scale technology, of equal feature size (which may be, for example, a minimum feature size that a given detection unit 12 can reliably operate with). Just as a generic example, the scales 20 may be realized using sequences of rectangular features 20 micrometers in width, with dark/opaque features indicating binary symbol "1" and light/transmissive features indicating binary symbol "0". Scales 20-1 and 20-2 both use a ML sequence, of size $2^M-1$ and $2^{M+1}-1$ respectively (M is an arbitrary integer, e.g., 12). Because the code tracks have the same feature size, the size of the scale pattern 20-2 is necessarily twice (if $2^M \gg 1$) the size of scale 20-1, to accommodate the ~2× longer code track. There is no possibility of having a scale of intermediate size, as long as ML codes are used and the feature size remains the same. Thus, if a given application requires a scale size in between the scales 20-1 and 20-2, it is necessary to use different feature sizes and a corresponding different detection unit 12. This can be an undesirable constraint on design and deployment of rotary position encoders.

In contrast to the scales 20-1 and 20-2, the scale 20-3 employs a non-ML code, shown as having a length $2^{M+1}-x$ (where x is substantially arbitrary, subject to finding a suitable code such as described herein). Accordingly, the code track for scale 20-3 can be realized at a length that corresponds to a desired size for the scale 20-3, which in generally may be anywhere in the range between scales 20-1 and 20-2. For example, if M is 9 such that $2^M-1$ equals 511 and $2^{M+1}-1$ equals 1023, the scale 20-3 could have a length generally anywhere in the range of 512 and 1023, subject again to finding a suitable code. This can improve flexibility in the design and deployment of rotary position encoders.

Figure 3:
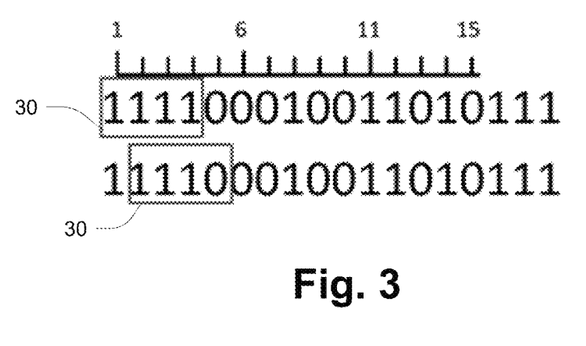
FIG. 3 is a depiction of an example random sequence encoding 15 positions.

FIG. 3 illustrates an LFSR-generated random sequence that can be used for absolute position encoding. In this example having m=4, a 4-bit reading window 30 reads successive overlapping 4-bit values from a random sequence by sliding unidirectionally with one-bit increments. At each position, the 4-bit code acquired by the reading window 30 is unique and never repeats itself within the 15 coded positions. Therefore, the random sequence shown in FIG. 3 encodes 15 ($2^4-1$) different positions with a 4-bit reader.

Figure 4:
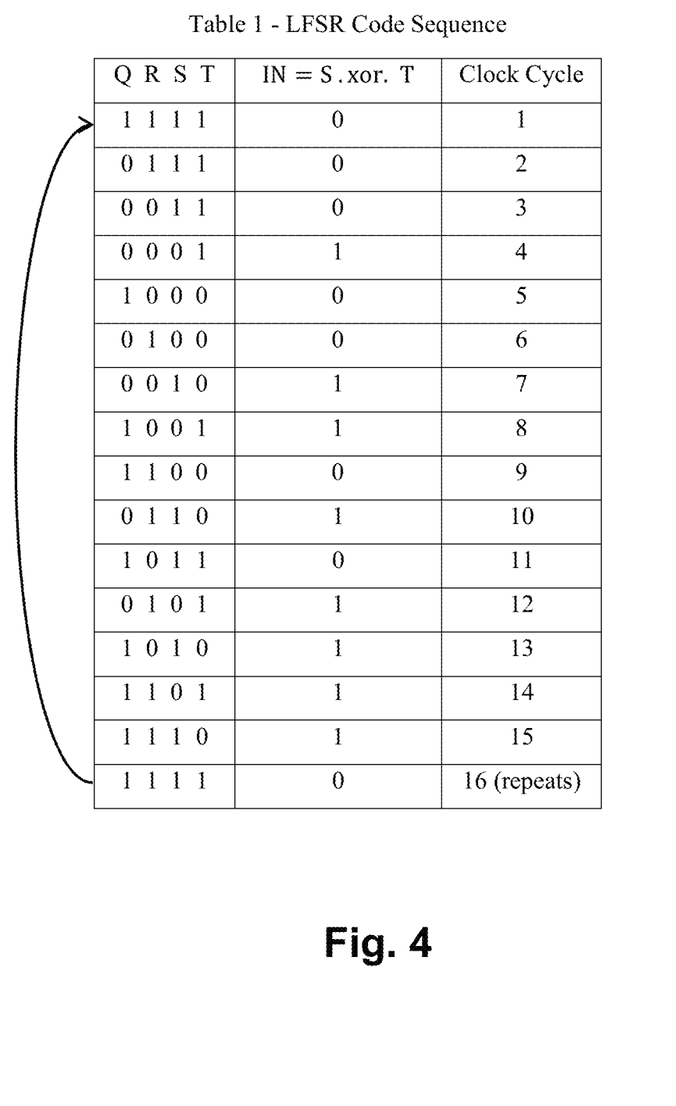
FIG. 4 is a table illustrating LFSR-based generating of the random sequence of FIG. 3.

FIG. 4 presents Table 1 which shows how to generate the random sequence of FIG. 3 by using LFSR. The 4 bits are labelled Q, R, S and T as shown. A seed 1111 is selected. Any 4-bit sequence can be used as the seed except 0000. T and S are selected as the tap numbers. At each iteration, to generate the next 4-bit code, QRS are shifted to RST in the next row and Q is replaced by the exclusive OR of T and S. Table 1 shows that 15 positions (15 rows) are encoded with 4-bit data for each position. The $16^{th}$ row is a repetition of the $1^{st}$ row, and thus the pattern repeats every 15 cycles. If (as here) the length of the sequence is equal to $2^m-1$ (m is number of bits detect by the reader), the sequence is called maximal length random sequence (MLRS).

One important feature of MLRS is that the table cycles back to the first row after the last row ($15^{th}$ row) and thus the sequence can be used for rotary position encoding (i.e., the code satisfies a "rotary constraint" as described below).

Figure 5:
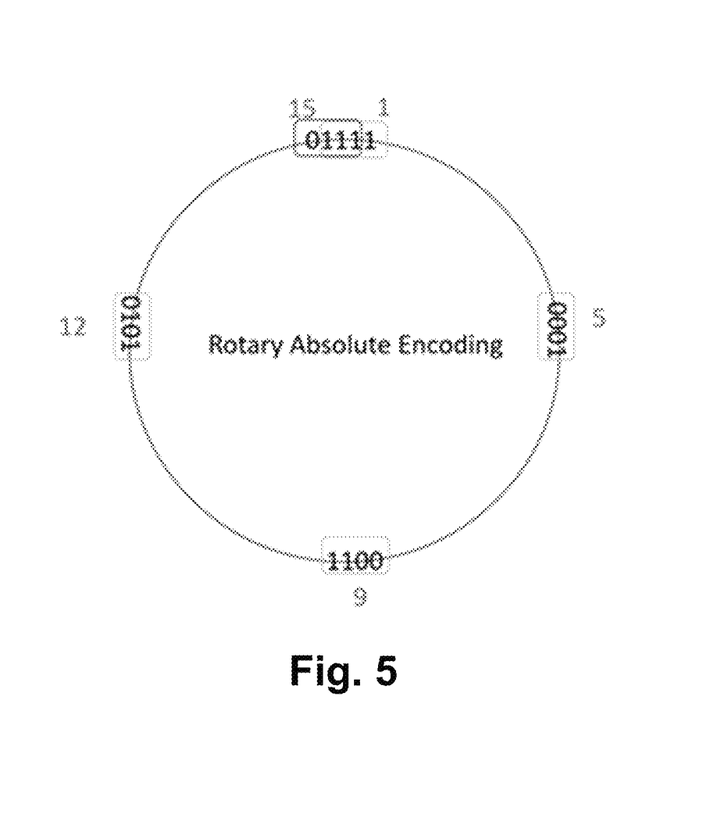
FIG. 5 is a schematic depiction of a rotary encoder encoding constraint.

FIG. 5 illustrates the so-called "rotary constraint" that is applicable when an LFSR is used for rotary encoding. It is required that the last m−1 bits (e.g., Q, R, S) of the last row (also called the end code word) are equal to first m−1 bits (e.g., T, S, R) of the first row (seed). In this example, this constraint is satisfied by the 3-bit sequence 111 as shown. MLRS automatically fulfills this requirement and thus any column of Q, R, S, T can be used for rotary encoding of 15 positions. However, as described above, using MLRS for rotary encoding may limit the number of encoded positions to powers of 2 minus 1. With a fixed minimum resolvable feature, the diameter of rotary scales jumps at the increment of power of 2 (if $2^m \gg 1$). If a finer increment of scale size is needed (e.g., intermediate size such as the size of scale 20-3 described above), some other coding technique must be used to provide codes of generally arbitrary length.

Figure 6:
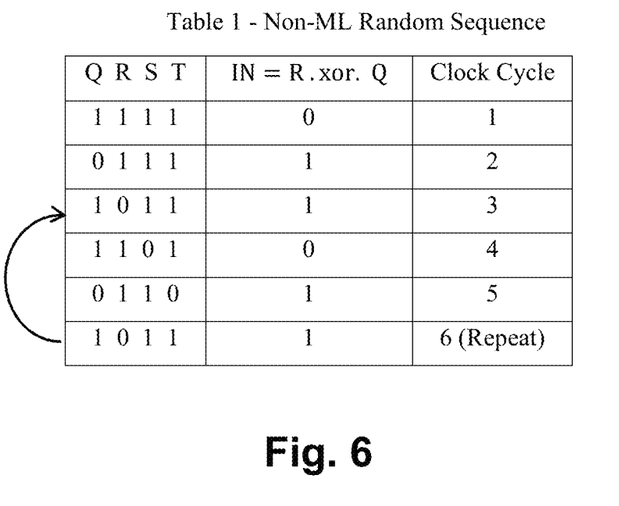
FIG. 6 is a table showing the effect of using different tap numbers for forming a random sequence.
Figure 7:
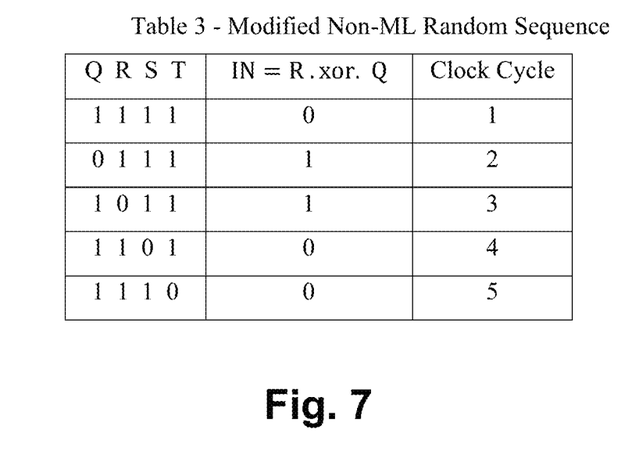
FIG. 7 is a table showing the effect of forcing an end code word to satisfy a rotary constraint.

FIG. 6 presents Table 2 which is an example showing that if different tap numbers, such as R and Q, are selected, the sequence starts to repeat itself at a different row (e.g., 6th row) and the length of the sequence is reduced accordingly (e.g., 15 to 5). However, in this case, the sequence does not cycle back to the seed, but rather to the 3rd row, and thus this sequence does not satisfy the rotary constraint and cannot be used for rotary encoding. FIG. 7 presents Table 3 which shows that if the end code word is forced to satisfy the rotary constraint (LSB to MSB−1 of the end code word are equal to MSB to LSB+1 of the seed), any Q, R, S, T column can be used for encoding of 5 unique rotary positions with 5 unique code words in each row.

Figure 8:
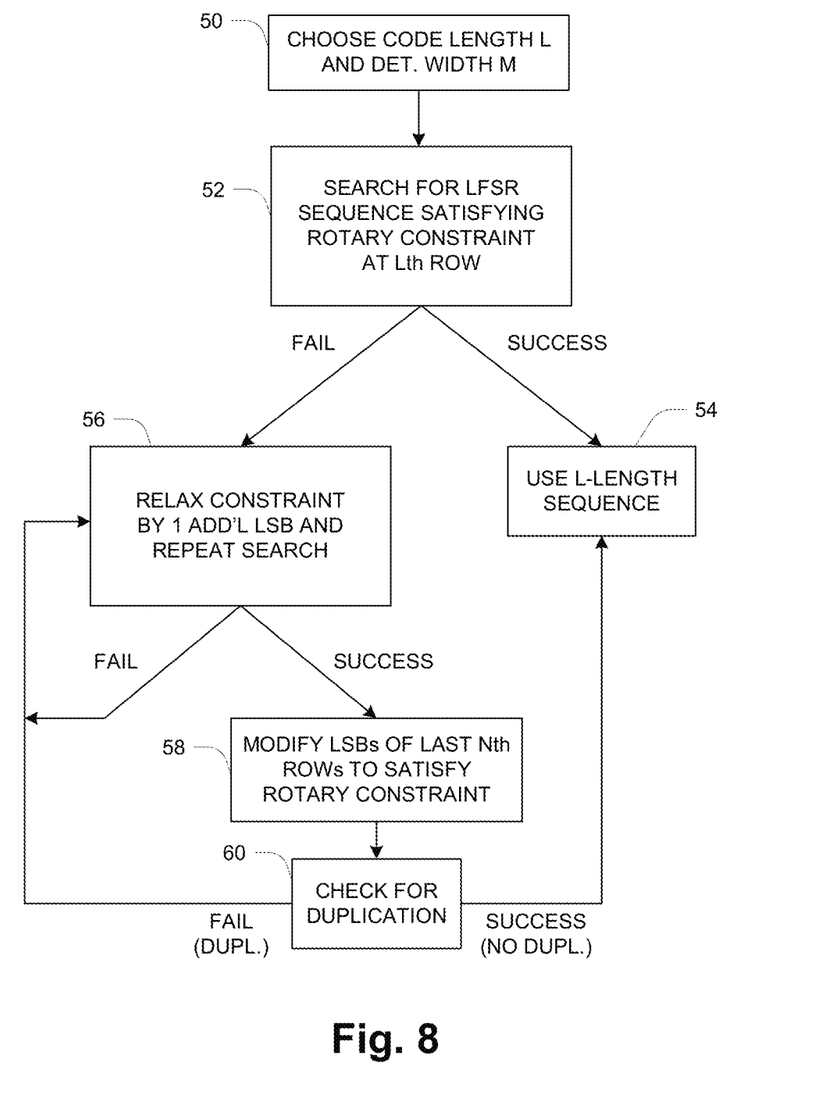
FIG. 8 is a flowchart of a process for creating pseudo-random sequence for rotary encoder of given (generally non-maximal) length.

FIG. 8 shows a flow chart of creating a rotary random sequence with arbitrary (generally, non-maximum) length. The first step at 50 is to decide the length of rotary sequence, L, based on the size of the scale 10 and minimum resolvable feature size. The number of minimum resolvable feature that could be accommodated by the detection unit 12 determines detector bit width M, i.e., the number of bits M read by the detection unit 12. In the next step 52, different seeds and taps combinations are used to form corresponding LFSRs to search if any combination meets the rotary constraint: LSB to MSB−1 of the Lth row (end code word) are equal to MSB to LSB+1 of the seed. If a combination is successfully identified, then at 54 the sequence generated by that LFSR can be used for rotary encoding.

If at step 52 no seed and tap number combination meets the rotary constraint, then at 56 the rotary constraint is relaxed by one additional LSB and the search is repeated. Specifically, the relaxed constraint is that LSB+N to MSB-1 of the Lth row (end code word) are equal to MSB to LSB+N+1 of the seed, where N is incremented for each repetition of step 56. When step 56 is performed directly from step 52, N is equal to 1, and thus the relaxed constraint is that LSB+1 to MSB-1 of Lth row are equal to MSB to LSB+2 of seed. Effectively, the constraint is relaxed by reducing the number of bits that have to match, which increases the likelihood of a match while also requiring some additional adjustment and checking on the back end, as described below.

If at a given iteration of step 56 no sequence satisfying the relaxed constraint is found, then step 56 is repeated with an incremented value of N. This reduces the number of bits required to match by one.

If at 56 a sequence is found for N=N', then at 58 the LSBs from the L-N'+1th row to the Lth row (i.e., the last Nth rows) are modified to match LSB+N' to LSB+1 of the seed for fulfilling the rotary constraint, and at 60 the modified rows are compared with other rows to check if there is any duplication. The modification at 58 ensures that the sequence transitions from the Lth row (end code word) back to the seed and all code words in each row satisfy the rotary constraint. The test at 60 is required because duplication would cause position ambiguity and thus should be avoided. If no duplication is found (success), then the sequence with the modified rows can be used at 54. Otherwise, the process loops back to step 56 with an incremented value of N to perform another search with further relaxed constraint.

Figure 9:
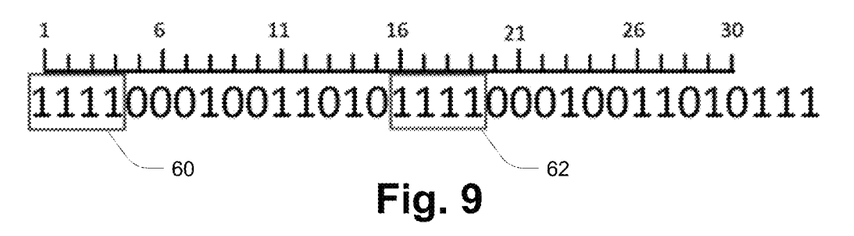
FIG. 9 is a schematic depiction of repetitive pseudo-random sequence.

FIG. 9 illustrates the possibility of further extending the length of position encoding (ML or non-ML) by using repeated random code sequences. In this example the length of position encoding is doubled from 15 to 30 by using the same random sequence twice. The duplication results in position ambiguity as indicated by the example sections 60, 62 (position 1 at 60 looks the same as position 16 at 62). This ambiguity needs to be differentiated by additional information.

The following are example methods to solve the ambiguity issue:
1) Add an additional track along with the main PRS track, and use a phase difference to distinguish the ambiguous positions.
2) Use different physical features of an additional track to distinguish the ambiguous positions.
3) Use different physical features of the random track itself (e.g., linewidth, line length, reflection, absorption, polarization, etc.) to distinguish the ambiguous positions.

Figure 10:
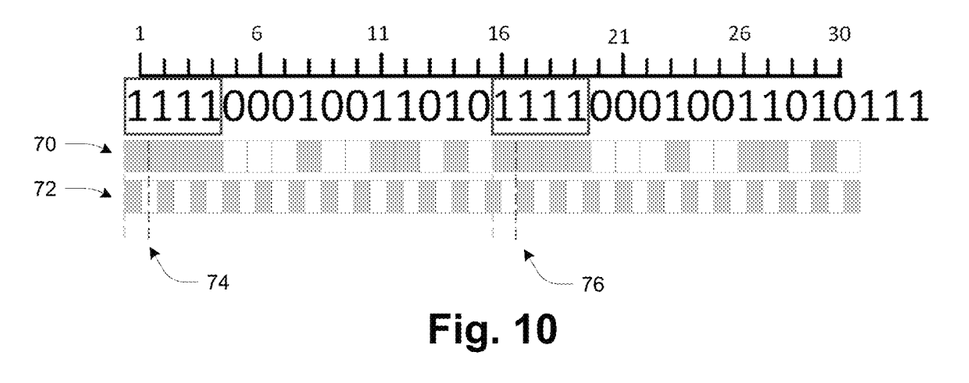
FIG. 10 is a schematic depiction of repetitive pseudo-random sequence with phase shift.

FIG. 10 shows an example of method (1) above, using phase difference of an additional track. The scale includes a main absolute track 70 and a second (incremental) track 72 whose linewidth is ⅔ of the linewidth of the main track 70. Vertical lines 74, 76 help illustrate the phase difference and its differentiating effect. For positions 1 and 16, the initial phases relative to the second track 72 are 0 and ½ *pi respectively and thus these two positions are distinguished accordingly. For positions 2 and 17, the initial phases relative to the second track 72 are 3/2*pi and 0 respectively. All the other pairs within these repeated sequences have different corresponding phases and can thus be distinguished. Therefore, the position ambiguity is resolved by adding a second periodic track that has phase differences between repetitions of the basic sequence. Also note that the second track 72 can be used for providing high resolution incremental position in conjunction with the absolute position information from the main track 70. The combined information could be used for improving the resolution of absolute encoder.

Figure 11:
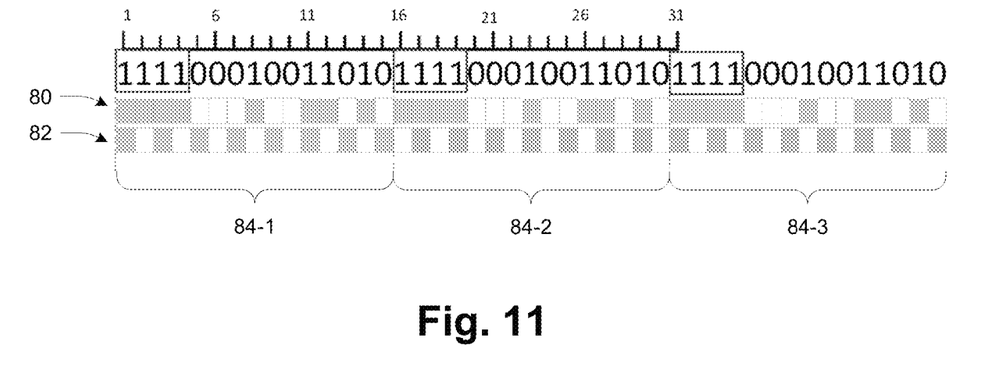
FIG. 11 is a schematic depiction of repetitive pseudo-random sequence with color coded incremental track.

FIG. 11 shows an example of method (2) above. In this case the linewidths of the main track 80 and second (incremental) track 82 are the same, and a different physical feature of the additional track 82 is altered is some manner for differentiating the ambiguous absolute positions. The physical features may include but not limited to color, length, reflectivity, absorption, polarization, and geometry shape, etc. FIG. 11 shows an example of using different colors in different sections 84 (84-1, 84-2, 84-3) of the second track 82 to resolve the ambiguous absolute positions.

Figure 12:
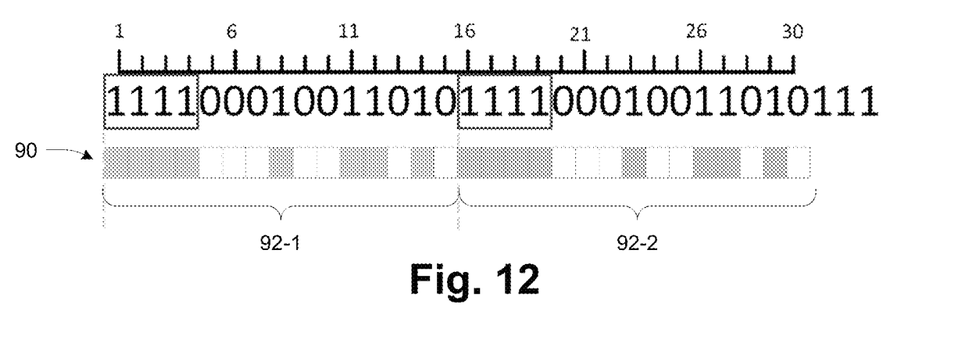
FIG. 12 is a schematic depiction of repetitive pseudo-random sequence with color coded absolute track.

FIG. 12 shows an example of method (3) above. In this case, no additional track is used, and the main track 90 itself is coded with physical features for differentiating the ambiguous positions. The physical features may include but not limited to color, length, reflectivity, absorption, polarization, and geometry shape, etc. FIG. 12 shows an example of using different colors in different sections 92 (92-1, 92-2) to resolve the ambiguous absolute positions.

Figure 13:
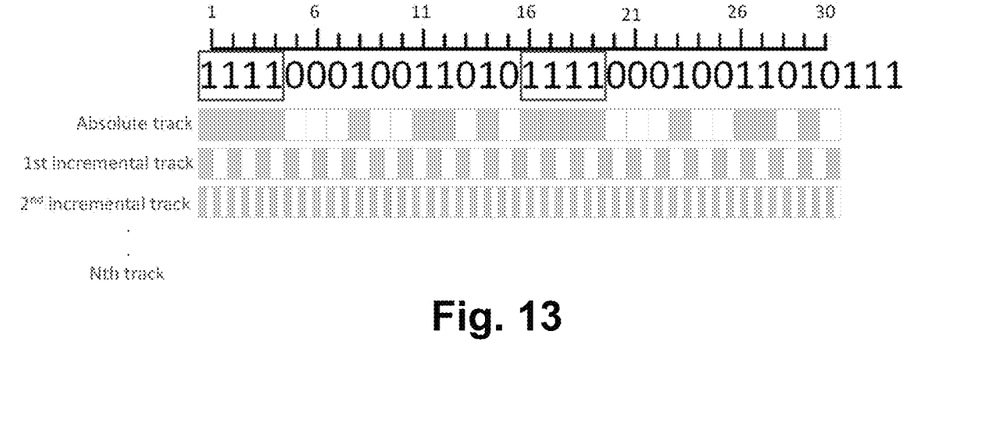
FIG. 13 is a schematic depiction of repetitive pseudo-random sequence with high-resolution incremental track and absolute position track.

FIG. 13 illustrates another embodiment in which additional incremental encoders with higher resolution are added and linked with the absolute encoder to create a higher resolution absolute encoder. There may be one or more such additional tracks, preferably of successively higher resolution. Different reading units with higher resolving capability are used for interpreting high resolution information from different tracks. If necessary, more tracks could be added and linked to improve the resolution even further.

Figure 14:
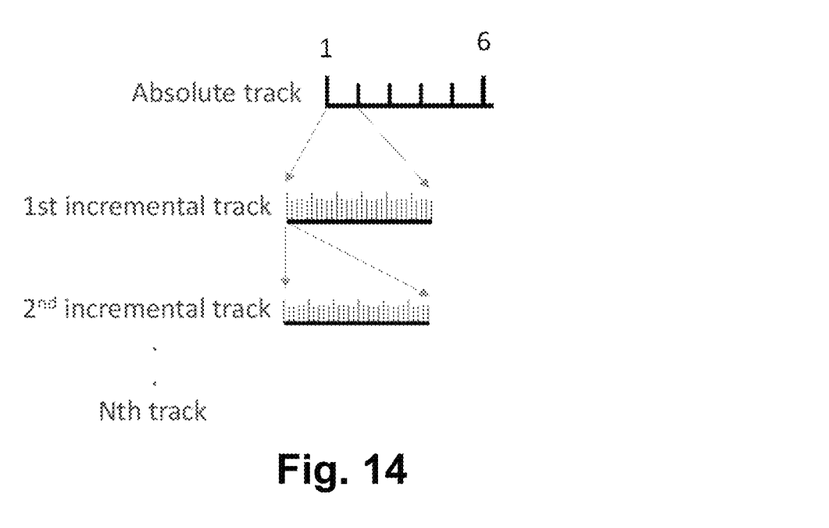
FIG. 14 is schematic depiction of track linking.

FIG. 14 illustrates an example of "linking" of a collection of tracks such as in the example of FIG. 13. Each individual bit position of a given track is linked to a corresponding multi-bit interval of the next-finer track. Thus, one bit of the absolute track is linked to a multi-bit interval of the $1^{st}$ incremental track, and one bit of the $1^{st}$ incremental track is linked to a multi-bit interval of the second incremental track, etc.

As mentioned above, one feature of the disclosed technique is the ability to use a detection unit with scales of generally arbitrary size. The detection unit must be able to recognize the scale elements of a given feature size, which is common among the scales, and is preferably configurable (e.g., via programming) to recognize the different LFSR codes (generally non-ML) that are used by the different scales. More specifically, assuming the detection unit is usable in two different rotary position encoders having respective first and second scales, each scale is co-configured with the detection unit to detect a relative rotational position therebetween and to generate a position output indicative thereof, and the scales have respective scale patterns thereon with scale elements having a common feature size and arranged according to respective first and second linear-feedback shift register (LFSR) pseudo-random codes. The LFSR codes are non-maximal-length (non-ML) codes having respective seed values, tap positions, and modified least-significant bit positions of respective code words that satisfy a relaxed rotary constraint by which the seed value follows in sequence from the end code word. The detection unit is able to detect the scale elements of the scales and to identify scale position based on (1) detection of the first LFSR code according to first configuration of the detection unit when used with the first scale, and (2) detection of the second LFSR code according to second configuration of the detection unit when used with the second scale.

While various embodiments of the invention have been particularly shown and described, it will be understood by those skilled in the art that various changes in form and details may be made therein without departing from the scope of the invention as defined by the appended claims.

What is claimed is:

1. A rotary position encoder, comprising:
a detection unit; and
a scale,
wherein the detection unit and scale are co-configured and co-operative to detect a relative rotational position therebetween and to generate a position output indicative thereof,
and wherein the scale has a scale pattern thereon according to a linear-feedback shift register (LFSR) pseudo-random code, the LFSR code being a non-maximal-length (non-ML) code having a seed value, tap positions, and modified least-significant bit positions of code words that satisfy a rotary constraint by which each code word follows in sequence from the adjacent code word,
and wherein, based on the seed value, tap positions, and sequence length, the number of modified least-significant bit positions is a minimal number that makes the LFSR code satisfy the relaxed rotary constraint and have no duplication of any code words.

2. The rotary position encoder of claim 1, wherein the non-maximal length code is a portion of a maximal-length code having the seed value, tap positions, and non-modified ML end code word that satisfies a non-relaxed rotary constraint by which the seed value follows in sequence from the ML end code word, and wherein the number of modified least-significant bit positions is a minimal number that makes the LFSR code satisfy the relaxed rotary constraint and have no duplication of any code words.

3. The rotary position encoder of claim 1, wherein the detection unit is an optical detection unit and the scale pattern is an optical scale pattern having elements that are optically sensed by the optical detection unit.

4. The rotary position encoder of claim 1, wherein the scale pattern has a main track having two or more repeated instances of the LFSR code, and the scale includes additional features sensed by the detection unit to differentiate among the repeated instances of the LFSR code and thereby provide for absolute position sensing along the main track.

5. The rotary position encoder of claim 4, wherein the detection unit is an optical detection unit and the scale pattern is an optical scale pattern having elements that are optically sensed by the optical detection unit, and wherein the additional features are optically detectable features.

6. The rotary position encoder of claim 5, wherein the optically detectable features are respective modifications of an optical characteristic of elements of the main track in the repeated instances of the LFSR code.

7. The rotary position encoder of claim 6, wherein the optical characteristic is one of wavelength, reflectivity, absorption, transmission, geometry, phase, and polarization.

8. The rotary position encoder of claim 5, wherein the optically detectable features are included in a second track of the scale pattern.

9. The rotary position encoder of claim 8, wherein the optically detectable features are respective modifications of an optical characteristic of elements of the second track in areas corresponding to the repeated instances of the LFSR code.

10. The rotary position encoder of claim 9, wherein the optical characteristic is one of wavelength, reflectivity, absorption, transmission, geometry, phase, and polarization.

11. The rotary position encoder of claim 8, wherein the second track has a pattern with a varying phase difference with respect to the main track, and the optically detectable features are respective phase differences in areas corresponding to the repeated instances of the LFSR code.

12. The rotary position encoder of claim 1, wherein the scale pattern has a main track having two or more repeated instances of the LFSR code, and one or more incremental tracks providing successively higher-resolution position information, the incremental tracks being linked to each other and to the main track.

13. A scale for a rotary position encoder having a detection unit co-configured with the scale to detect a relative rotational position therebetween and to generate a position output indicative thereof, the scale having a scale pattern thereon according to a linear-feedback shift register (LFSR) pseudo-random code, the LFSR code being a non-maximal-length (non-ML) code having a seed value, tap positions, and modified least-significant bit positions of code words that satisfy a rotary constraint by which each code word follows in sequence from the adjacent code word,
wherein, based on the seed value, tap positions, and sequence length, the number of modified least-significant bit positions is a minimal number that makes the LFSR code satisfy the relaxed rotary constraint and have no duplication of any code words.

14. A detection unit for use in a rotary position encoder having a scale co-configured with the detection unit to detect a relative rotational position therebetween and to generate a position output indicative thereof, the scale having a scale pattern thereon with scale elements arranged according to respective a linear-feedback shift register (LFSR) pseudo-random code, the LFSR code being a non-maximal-length (non-ML) code having a seed value, tap positions, and modified least-significant bit positions of code words that satisfy a rotary constraint by which each code word follows in sequence from the adjacent code word, the detection unit being able to detect the scale elements of the scale and to identify scale position based on detection of the LFSR code according to a configuration of the detection unit when used with the scale,
wherein, based on the seed value, tap positions, and sequence length, the number of modified least-significant bit positions is a minimal number that makes the LFSR code satisfy the rotary constraint and have no duplication of any code words.

15. The detection unit of claim 14, wherein the scale is a first scale with which the detection unit is specifically configured for use, and the LFSR code is a first LFSR code, and wherein the detection unit is configurable for separate use with a second scale having a distinct second LFSR code being a second non-maximal-length (non-ML) code having respective second seed value, second tap positions, and second modified least-significant bit positions of code words that satisfy a second rotary constraint by which each code word follows in sequence from the adjacent code word, the detection unit being configurable for use with the second scale so as to detect the scale elements of the second scale and identify rotary position of the second scale based on detection of the second LFSR code.

* * * * *